US011025779B1

(12) United States Patent
Valley (10) Patent No.: US 11,025,779 B1
(45) Date of Patent: Jun. 1, 2021

(54) AUTOMATED PAYMENT REMINDERS

(71) Applicant: Wells Fargo Bank, N.A., San Francisco, CA (US)

(72) Inventor: Jeffrey M. Valley, Spokane, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/752,966

(22) Filed: Jan. 27, 2020

Related U.S. Application Data

(63) Continuation of application No. 15/136,271, filed on Apr. 22, 2016, now abandoned.

(51) Int. Cl.
| | |
|---|---|
| *H04M 3/51* | (2006.01) |
| *G06Q 50/00* | (2012.01) |
| *H04L 12/58* | (2006.01) |
| *G06Q 40/02* | (2012.01) |

(52) U.S. Cl.
CPC ........ *H04M 3/5191* (2013.01); *G06Q 40/025* (2013.01); *G06Q 50/01* (2013.01); *H04L 51/046* (2013.01); *H04L 51/32* (2013.01); *H04M 3/5158* (2013.01)

(58) Field of Classification Search
CPC ...... G06Q 20/10; G06Q 40/02; G06Q 20/102; G06Q 20/40; G06Q 20/32; G06Q 30/0601; G06Q 20/3223; G06Q 20/108; G06Q 20/14; G06Q 20/16; G06Q 20/227; G06Q 20/322; G06Q 20/3255; G06Q 20/3221; H04M 1/72522; H04M 17/20; H04M 15/835; H04M 15/84; H04M 15/844; H04M 15/85; H04M 17/202; H04W 4/00; H04W 4/24; H04W 4/12; H04W 4/14; H04W 4/18
USPC ... 705/39, 35, 40, 30, 16, 42, 41, 14.17, 17, 705/34; 455/466, 407, 414.1; 379/88.12
See application file for complete search history.

(56) References Cited

U.S. PATENT DOCUMENTS

| | | | |
|---|---|---|---|
| 6,052,674 A | 4/2000 | Zervides et al. | |
| 7,707,637 B2 | 4/2010 | Kaler et al. | |
| 8,577,000 B1 * | 11/2013 | Brown .............. | H04M 1/72572 379/114.13 |
| 8,595,845 B2 | 11/2013 | Basavapatna et al. | |
| 9,094,407 B1 | 7/2015 | Matthieu et al. | |
| 2004/0167853 A1 | 8/2004 | Sharma | |
| 2005/0136903 A1 | 6/2005 | Kashima et al. | |
| 2006/0041848 A1 | 2/2006 | Lira | |
| 2007/0083465 A1 | 4/2007 | Ciurea et al. | |
| 2009/0069038 A1 | 3/2009 | Olague et al. | |
| 2009/0300668 A1 * | 12/2009 | Campagna ......... | H04N 21/4751 725/2 |
| 2010/0125495 A1 * | 5/2010 | Smith ................ | G06Q 30/0601 705/14.23 |
| 2011/0047221 A1 * | 2/2011 | Watanabe ............. | H04L 67/30 709/206 |
| 2011/0194676 A1 | 8/2011 | Hogan et al. | |

(Continued)

*Primary Examiner* — Ahmad F. Matar
*Assistant Examiner* — Kharye Pope
(74) *Attorney, Agent, or Firm* — Merchant & Gould P.C.

(57) ABSTRACT

An electronic computing device establishes a communication session between a lender of a loan and a recipient of the loan. A debt owed to the lender by the recipient is tracked. Upon an initial communication between the lender and the recipient, a debt reminder is displayed on a display screen of the electronic computing device. The debt reminder provides a reminder to the lender that the debt is owed to the lender by the recipient.

20 Claims, 12 Drawing Sheets

(56) References Cited

U.S. PATENT DOCUMENTS

| | | |
|---|---|---|
| 2011/0238544 A1 | 9/2011 | Segall |
| 2012/0116967 A1 | 5/2012 | Klein et al. |
| 2012/0191585 A1* | 7/2012 | Lefebvre ................ G06Q 40/00 |
| | | 705/35 |
| 2012/0232954 A1 | 9/2012 | Calman et al. |
| 2012/0290467 A1* | 11/2012 | Shenkar ................ G06Q 50/01 |
| | | 705/38 |
| 2012/0310824 A1 | 12/2012 | Liberty |
| 2013/0024360 A1 | 1/2013 | Ballout |
| 2013/0085936 A1* | 4/2013 | Law ........................ H04L 12/14 |
| | | 705/40 |
| 2013/0293363 A1 | 11/2013 | Plymouth et al. |
| 2013/0325718 A1 | 12/2013 | Khan |
| 2014/0032407 A1 | 1/2014 | Kapur et al. |
| 2014/0108240 A1 | 4/2014 | Loman et al. |
| 2014/0160157 A1 | 6/2014 | Poulos et al. |
| 2014/0172679 A1 | 6/2014 | Shimko |
| 2014/0180916 A1* | 6/2014 | Sharma ................. G06Q 20/14 |
| | | 705/40 |
| 2014/0244834 A1 | 8/2014 | Guedalia et al. |
| 2014/0279449 A1 | 9/2014 | Ginder et al. |
| 2015/0026034 A1 | 1/2015 | Stibel |
| 2015/0066670 A1 | 3/2015 | Wentker et al. |
| 2015/0105043 A1* | 4/2015 | Puvvula ............... H04L 12/1414 |
| | | 455/405 |
| 2015/0324899 A1* | 11/2015 | Starikova ............... G06Q 40/00 |
| | | 705/35 |
| 2016/0037438 A1* | 2/2016 | Manroa ................. H04W 48/16 |
| | | 370/338 |
| 2016/0071206 A1 | 3/2016 | Danieli |
| 2016/0180466 A1 | 6/2016 | Caldwell |
| 2017/0169508 A1* | 6/2017 | Song .................... G06Q 40/025 |
| 2017/0282912 A1* | 10/2017 | Chan ....................... A61B 7/04 |
| 2017/0286912 A1 | 10/2017 | Zhang et al. |

\* cited by examiner

| Outstanding Loans | |
|---|---|
| 📌 Richard | $10.00 |
| 📌 Eric Ford | $20.00 |
| 📌 Tom Burk | $43.00 |
| Total | $73.00 |

402 — Richard
404 — Eric Ford
406 — Tom Burk
408 — Total

AUTOMATED PAYMENT REMINDERS

BACKGROUND

It is not uncommon for people to borrow money from others. In one example, a person borrowing money may not have enough cash on hand to make a purchase. In other examples, the person borrowing the money may have left a wallet or a purse in a car or forgotten to take the wallet or purse with them. Friends, relatives and others may loan the person money to help them out.

When people borrow small amounts of money from others over a period of time, they sometimes forget that they have borrowed the money and may not repay the money. When loans are not repaid and a lender has outstanding loans to multiple people, obtaining payment for the loans can be a burden to the lender.

SUMMARY

Embodiments of the disclosure are directed to an electronic computing device comprising: a processing unit; and system memory, the system memory including instructions which, when executed by the processing unit, cause the electronic computing device to: establish a communication session between a lender of a loan and a recipient of the loan; track a debt owed to the lender by the recipient; and upon an initial communication between the lender and the recipient, display a debt reminder on a display screen of the electronic computing device, the debt reminder providing a reminder to the lender that the debt is owed to the lender by the recipient.

In another aspect, a method implemented on a first electronic computing device for payment of a debt, the method comprising: receiving a first communication from a first user at a second electronic computing device; determining whether a second user using the first electronic computing device owes a first debt to the first user using the second electronic computing device; when a determination is made that the second user owes the first debt to the first user: displaying a first debt reminder on the first electronic computing device, the first debt reminder indicating that the first debt is owed to the first user and including an amount of the first debt; and displaying a payment control on the first electronic computing device, the payment control permitting the second user to initiate a transfer of funds to the first user responsive to the debt owed to the first user; receiving a notification that the first debt has been repaid to the first user; and displaying a message on the first electronic computing device when the first debt has been repaid.

In yet another aspect, a computer-readable data storage memory comprises instructions that, when executed by a processing unit of a first electronic computing device, cause the processing unit to: display on the first electronic computing device a selection of debt reminder types, the debt reminder types specifying a type of communication which when received at the first electronic computing device or sent from the first electronic computing device causes a debt reminder to be displayed when a first user using the first electronic computing device is owed money by a second user using a second electronic computing device and a communication corresponding to a selected debt reminder type is received from the second electronic computing device or sent to the second electronic computing device, the debt reminder types including a telephone call, a text message, an email message, a social media post and an instant message; receive a selection of one or more of the debt reminder types; send the communication corresponding to a selected debt reminder type to the second user at the second electronic computing device; determine whether the second user owes money to the first user; when a determination is made that the second user owes money to the first user, display the debt reminder on the first electronic computing device, the debt reminder providing a first notification that the second user owes a specific amount of money to the first user; receive a message from a server computer indicating that the second user has repaid the money owed to the first user; and display on the first electronic computing device a second notification that the second user has repaid the money owed to the first user.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods that provide automatic payment reminders on a user's computing device regarding a loan that is outstanding. When a lender of the loan establishes a communication session with a recipient of the loan, a notification can be displayed on the computing device of the lender that a debt is owed by the recipient and a notification can also be displayed on the computing device of the recipient that the recipient owes a debt to the lender. The communication session can comprise a telephone call, a text message, an instant message, a toast message, or a similar type of communication where a dialog can be established.

When a communication is received on the computing device of recipient of the loan, the recipient can use a software application on the computing device of the recipient to pay the loan. In an implementation described in this disclosure, the computing device of the lender and the recipient are each mobile computing devices, such as smartphones or tablet computing devices. However, in other implementations, non-mobile computing devices, for example desktop computers can be used.

In the implementation described in this disclosure, the loan comprises a debt of money, for example a specific amount of money that is loaned to the recipient by the lender. However, in other implementations, non-monetary goods and services can be loaned. For example, non-monetary items can include a lunch, a cup of coffee, a dozen eggs, a hand tool or yard implement or other non-monetary goods. In addition, loans can comprise a personal service such as providing a ride to work, watching a neighbor's children, mowing a neighbor's lawn, watching a neighbor's pet, etc.

The systems and methods disclosed herein are directed to a computer technology that can embed a debt payment reminder mechanism into a communication application. In addition to having loan reminders activated at a specific time and date, the debt payment reminder can be automatically activated during communications between a lender and a debtor. Because the payment reminders are activated in this manner, the payment reminders are likely to be more effective in getting the loan repaid than if the loan reminders are activated at fixed times and where both parties in the loan aren't involved at a time of activation. As a result, less payment reminders may be needed to motivate a recipient of a loan to repay the loan. This can improve efficiencies of the smartphones of the lenders and recipients because fewer reminders may be necessary.

Figure 1:
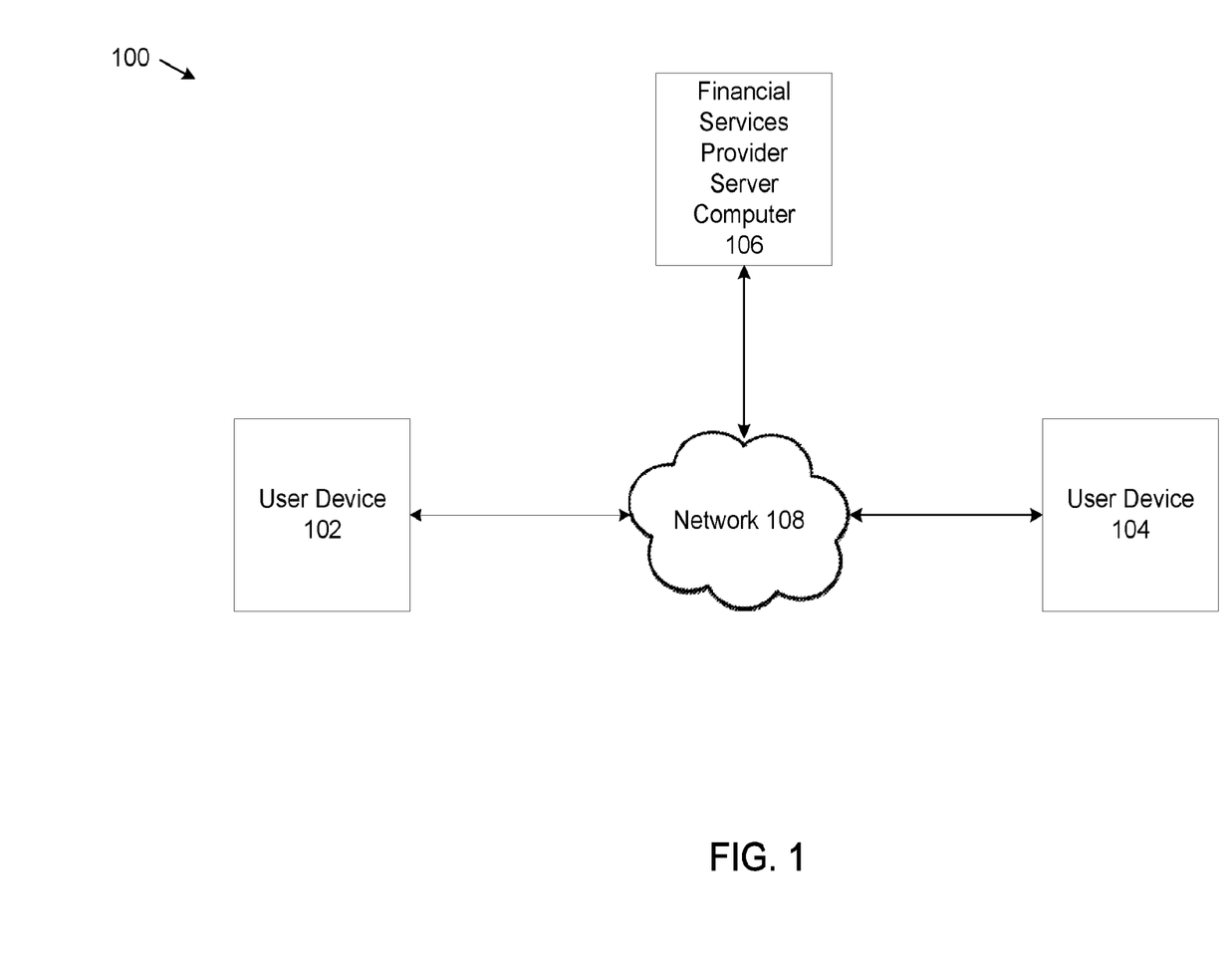
FIG. 1 shows an example system that supports automated payment reminders.

FIG. 1 shows an example system 100 that supports automated payment reminders. The system 100 includes a user device 102, a user device 104, a financial services provider server computer 106 and a network 108. More, fewer or other components are possible.

For the implementation of system 100, the example user device 102 and user device 104 are mobile electronic computing devices such as smart phones and tablet computers. The mobile electronic devices include an embedded communications module that can permit user device 102 to communicate with user device 102. The communications module can include software that can support telephonic communication, text messaging and instant messaging and can establish a communication session between user device 102 and user device 104. The mobile electronic devices can also include a payment application that can permit peer-to-peer payments. Examples of payment applications can include Android Pay, Apple Pay, Samsung Pay, Venmo, Google Wallet and PayPal. Other peer-to-peer payment applications are possible.

The example financial services provider server computer 106 is a server computer associated with the peer-to-peer payment application. For example, when the payment application is Google Wallet, the financial services provider server computer 106 can be a server computer that supports Google Wallet.

The example network 108 is a computer network, such as the Internet, that can permit communication between user device 102, user device 104 and financial services provider server computer 106. When user device 102 and user device 104 are smartphones or tablet computers, the communication is via wireless.

Figure 2:
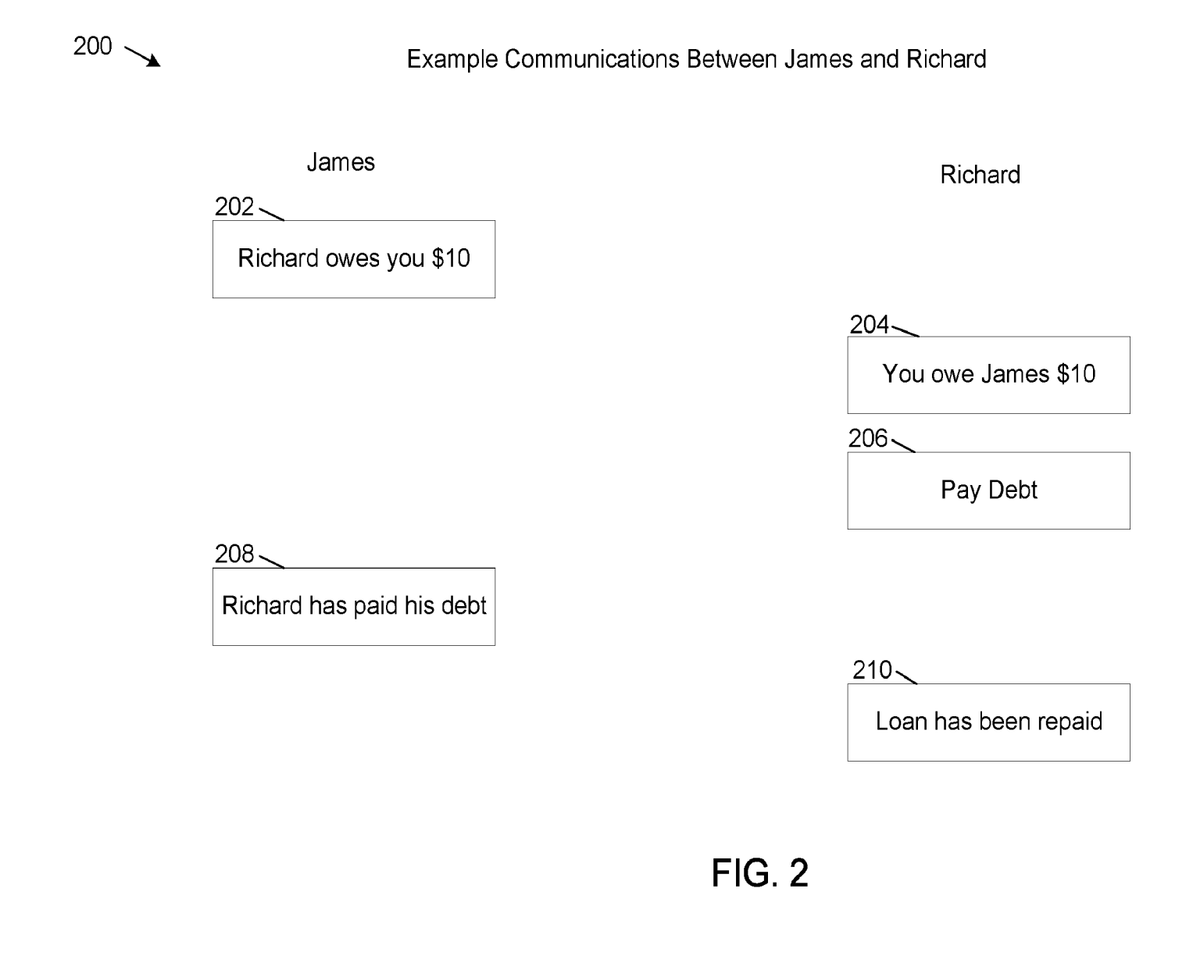
FIG. 2 shows an example communication flow between the two user devices of FIG. 1.

FIG. 2 shows an example communication flow 200 between two mobile user devices. For the example communication flow 200, James is a user at user device 102, a smartphone, and Richard is a user at user device 104, also a smartphone. In this example, the communication flow 200 comprises a texting session between James and Richard. However, there can be a similar communication flow for over types of communication between James and Richard, such as a telephone call or an instant messaging session.

For the example communication flow 200, James sends a text message to Richard. The text message can composed from a message composer that is part of the communication application. A content of the text message is not relevant to this discussion and is not shown in FIG. 2. As a result of sending a text message to Richard, the communication application of James' smartphone determines that Richard owes James $10. As a result, the communication application displays an example reminder message 202 "Richard owes you $10" on James' smartphone. In addition, the communication application can cause a debt reminder to be included in the text message to Richard. The debt reminder can be displayed on Richard's smartphone when Richard receives the text message.

In some implementations, the reminder message 202 can be displayed before James sends the text message to Richard. For example, the reminder message 202 can be displayed when James selects Richard's name from a contact list on James' smartphone. By viewing the reminder message 202 before the text message is sent, James may alter the text or tone of the text message. In a similar manner, when the communication is a telephone call, a reminder message can be displayed on James smartphone when James selects Richard's name from the contact list, before the telephone call is made.

In some implementations, the reminder message 202 can be displayed in a pop-up window on Richard's smartphone. In other implementations, the reminder message 202 can be overlaid on an existing display on Richard's smartphone. The use of pop-windows and overlays can apply to other messages discussed next herein for James' and Richard's smartphone.

When Richard receives the text message from James, a communication application on Richard's smart phone determines that a debt reminder is included in the text message and that James owes Richard $10. As a result, the communication application on Richard's smartphone displays a debt reminder 204 "You owe James $10" on Richard's smartphone. In one example, the debt reminder 204 is displayed as part of the text message. In other examples, the debt reminder 204 can be displayed as a pop-up or toast message. Other configurations are possible.

In some implementations, the debt reminder 204 may be displayed on Richard's smartphone before the text message from James is opened or before a telephone call is received. In this way, Richard can change his approach to responding to the text message or telephone call without being taken by surprise.

In addition, after the debt reminder 204 is displayed, a payment control 206 with an example text "Pay Debt" can be activated on Richard's smartphone. The payment control 206 provides Richard with the ability to pay the $10 debt to James, for example using a financial services provider such as PayPal. In some implementations, the payment control 206 can comprise a payment icon that pops up on Richard's smartphone. In other implementations, the payment control 206 can comprise an electronic button that the user can select. Other implementations of the payment control 206 are possible.

For the example of FIG. 2, when the payment control 206 is rendered and activated, Richard pays the $10 debt to James. In some implementations, Richard can pay the $10 debt simply by selecting the payment control. In other implementations, depending on security considerations, Richard may need to enter an access code, personal identification number (PIN), account number or other identifying information in order to be authorized to pay the $10 debt. In some implementations, Richard's biometric information, such as a finger print or retinal scan, can be read by Richard's user device 104.

When Richard pays the $10 debt to James, the financial services provider server computer 106 sends a notification to James' smartphone that Richard has paid the $10 debt. As a result, the communication application on James' smartphone displays a message 208 on James smartphone, indicating that Richard has paid his debt. In addition, the communication application of Richard's smartphone displays a message 210 on Richard's smartphone, indicating that the loan to Richard has been repaid.

Figure 3:
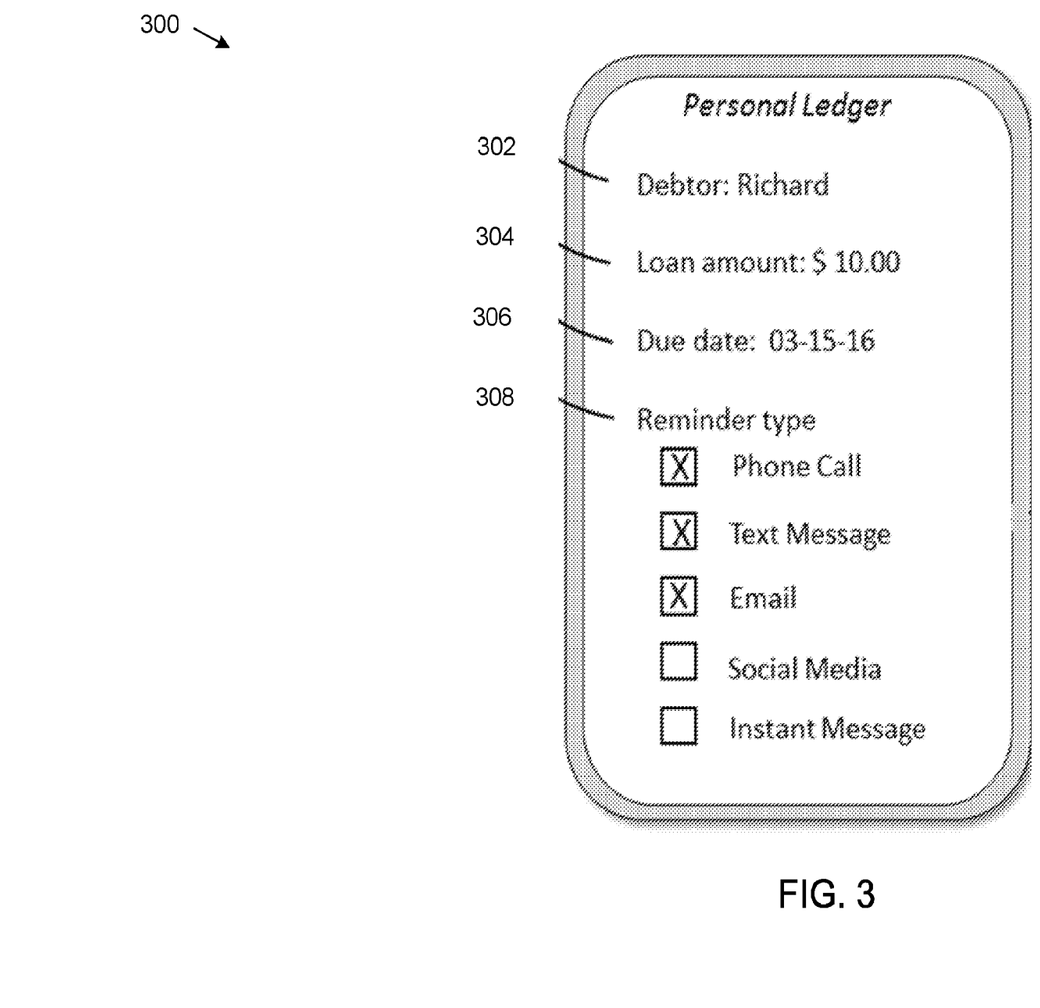
FIG. 3 shows an example personal ledger rendered on a user device of FIG. 1.

FIG. 3 shows an example personal ledger 300 that can be rendered on a graphical user interface (GUI) of James' user device 102. The example personal ledger 300 includes a name 302 for a debtor, in this case Richard, a loan amount 304 for an amount of $10.00, a due date 306 of Mar. 15, 2016 and a debt reminder type 308. The example debt reminder type 308 can be a type of communication such as a phone call, a text message, an email, social media or an instant message. A checkbox shown to the left of each debt reminder type 308 permits a selection via the GUI of a type of communication corresponding to an associated debt reminder type 308. As shown in FIG. 3, James has selected reminders to be displayed on Richard's smartphone when any of a phone call, text message or email from James is received at Richard's smartphone.

Figure 4:
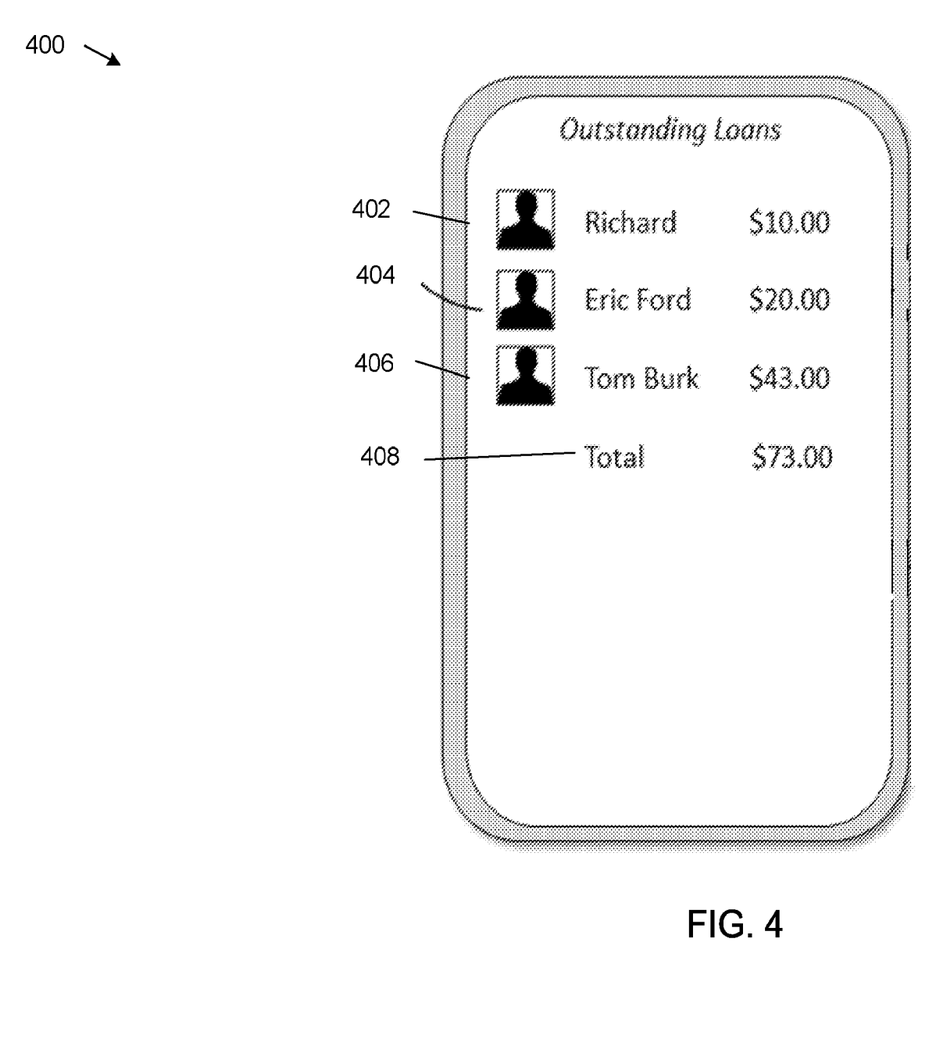
FIG. 4 shows example listing of outstanding loans rendered on a user device of FIG. 1.

FIG. 4 shows an example listing of outstanding loans 400 that can be displayed on James' user device 102. As shown in FIG. 4, James has outstanding loans to Richard 402 for an amount of $10.00, to Eric Ford 404 for an amount of $20.00 and to Tom Burk 406 for an amount of $43.00. Also shown is a total 408 of James' outstanding loans, equaling $73.00.

Figure 5:
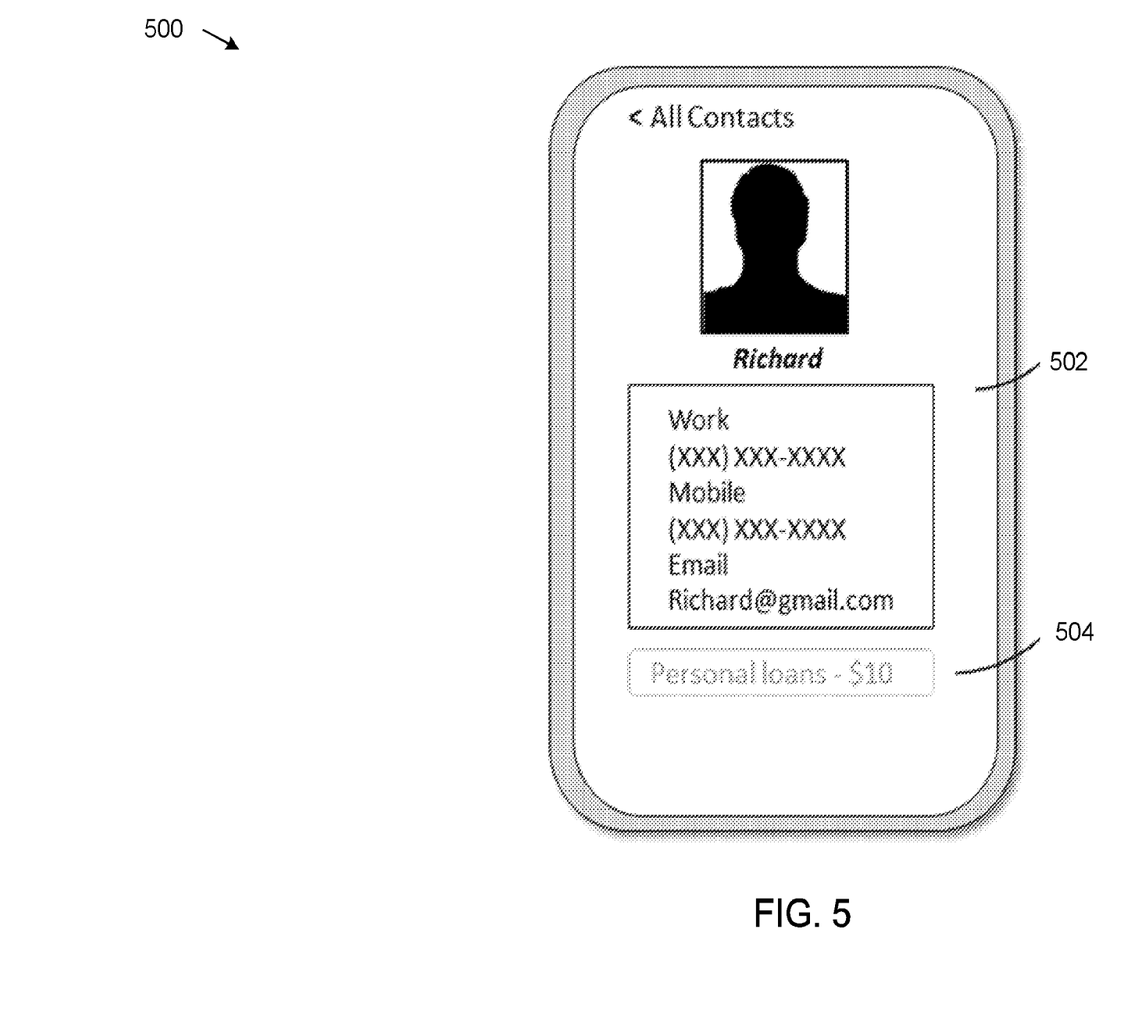
FIG. 5 shows example user contact information rendered on a user device of FIG. 1.

FIG. 5 shows an example display of Richard's contact information 500 on James' user device 102. The example contact information 500 includes a contact block 502 showing Richard's work and mobile telephone numbers and Richard's email address. The contact information 500 also includes personal loan block 504 showing any personal loans from James to Richard and the amount on the personal loans. As shown in personal loan block 504, James has an outstanding personal loan to Richard in an amount of $10.

In addition to recording and tracking personal loans and facilitating payment of personal loans via a mobile user device, applications on the mobile user device can also be used to help a user manage financial transactions. For example, one or more applications can be integrated with a user's bank, credit card and other financial services. Various messages can be provided to the user to help the user manage their financial transactions.

Figure 6:
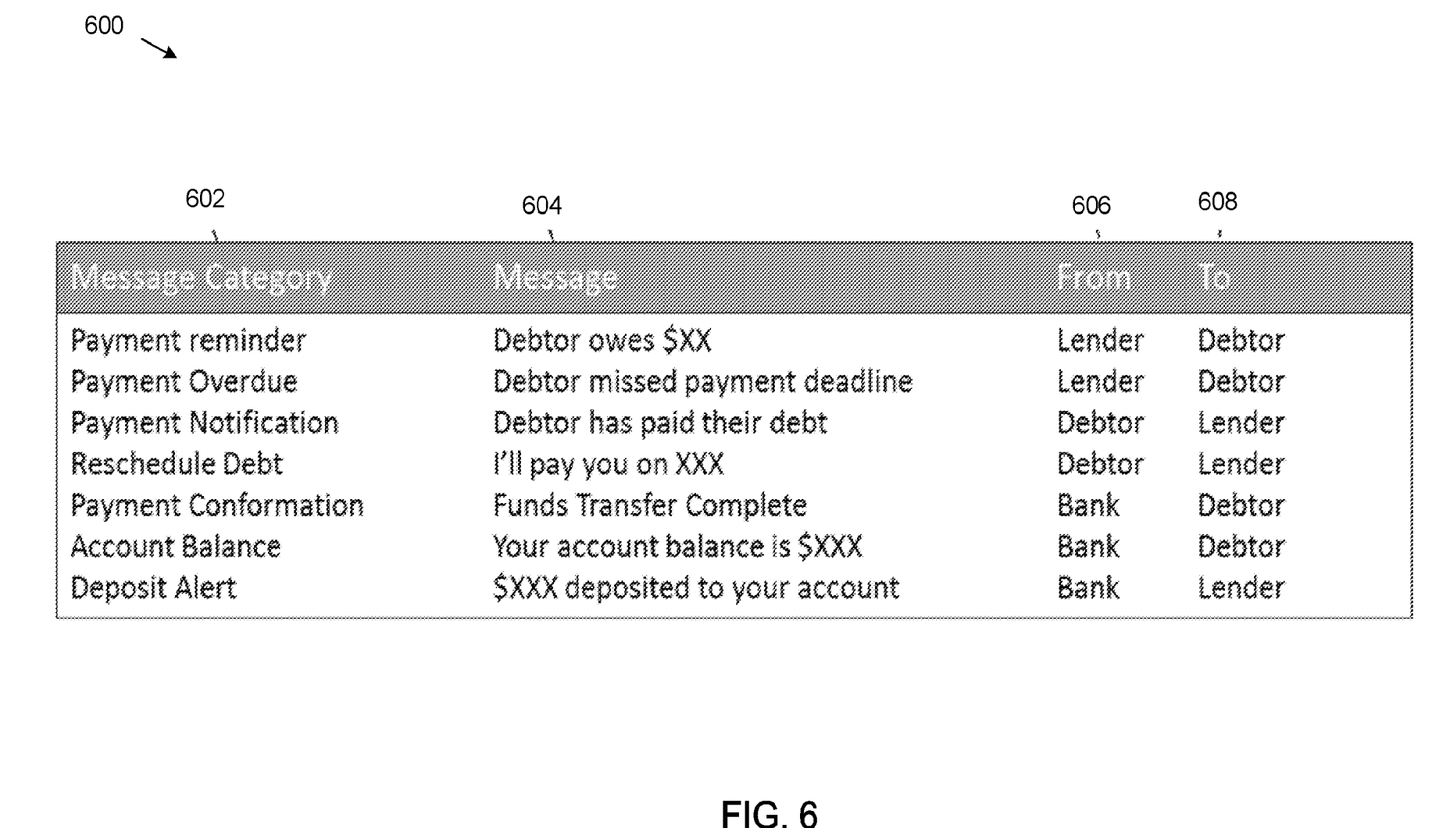
FIG. 6 shows a table of various message categories that can be used with the user devices of FIG. 1.

FIG. 6 shows a table 600 of various message categories and messages that can help the user manage their financial transactions. The example table 600 includes columns for message category 602, message 604, from 606 and to 608. Example message categories include payment reminder, payment overdue, payment notification, reschedule debt, payment confirmation, account balance and deposit alert.

For a payment reminder, an example message can be that the debtor owes a specific dollar amount, the message being sent from a lender to a debtor. For a payment overdue, a message can be that the debtor missed a payment deadline, the message being sent from the lender to the debtor. For a payment notification, the message can be that the debtor has paid their debt. For reschedule debt, the message can be that the debtor will pay be lender on a specific date. For a payment confirmation, the message can be that a funds transfer is complete, the message being sent from a bank to the debtor. For an account balance, the message can be a statement regarding a current account balance, the message being sent from the bank to the debtor. For a deposit alert, the message can be that a specific dollar amount was deposited to the lender's account, the message being sent from the bank to the lender.

Figure 7:
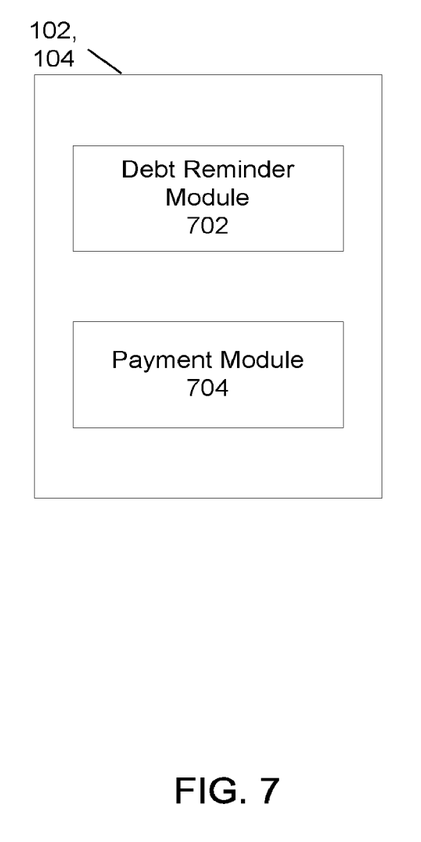
FIG. 7 shows example modules for a communication application that can be implemented on a user device of FIG. 1.

FIG. 7 shows example modules of user device 102 or user device 104. The example modules include a debt reminder module 702 and a payment module 704. The example modules also include a communications module (not shown in FIG. 7). The communications module supports communications such as telephone communications, text messaging, email messaging, etc. for user device 102 and user device 104. In some implementations, the debt reminder module 702 can be embedded within the communications module. In other implementations, the debt reminder module can be separate from the communications module. More, fewer, or different modules are possible.

The example debt reminder module 702 can record and track personal loans and remind the user of user device 102 or user device 104 that they have outstanding loans. As discussed, a message or notification can be displayed on user device 102 or user device 104 when a telephone call, text message, email message, etc. is received at user device 102 or user device 104. In some implementations, the debt reminder module 702 can be independent of application software for implementing a telephone call, text message, email message, etc. In other implementations, the debt reminder module 702 can be embedded separately in application software included in the communications module for each communication method used.

The example payment module 704, can display a payment control, similar to payment control 206, to facilitate user payment of a personal loan. The payment module 704 can also provide a debtor and lender with various notifications, such as payment notifications, missing of payment deadlines, rescheduling a loan payment, notifications, etc.

Figure 8:
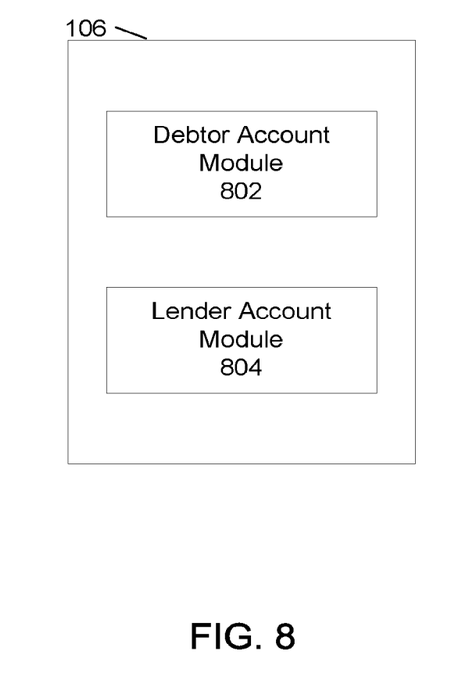
FIG. 8 shows example modules of the financial services server computer of FIG. 1.

FIG. 8 shows example modules of the financial services provider server computer 106. As stated earlier herein, the financial services provider server computer is a server computer associated with a financial services provider such as Google Wallet. The example modules include a debtor account module 802 and a lender account module 804. The example debtor account module 802 can include financial account information for the debtor and the example lender account module 804 can include financial account information for the lender. For example, the debtor account module 802 can include information for Richard and the lender account module can include financial account information for James. The financial information can include account numbers at the financial services provider, email addresses, bank account information, employment information and other personal information.

Figure 9:
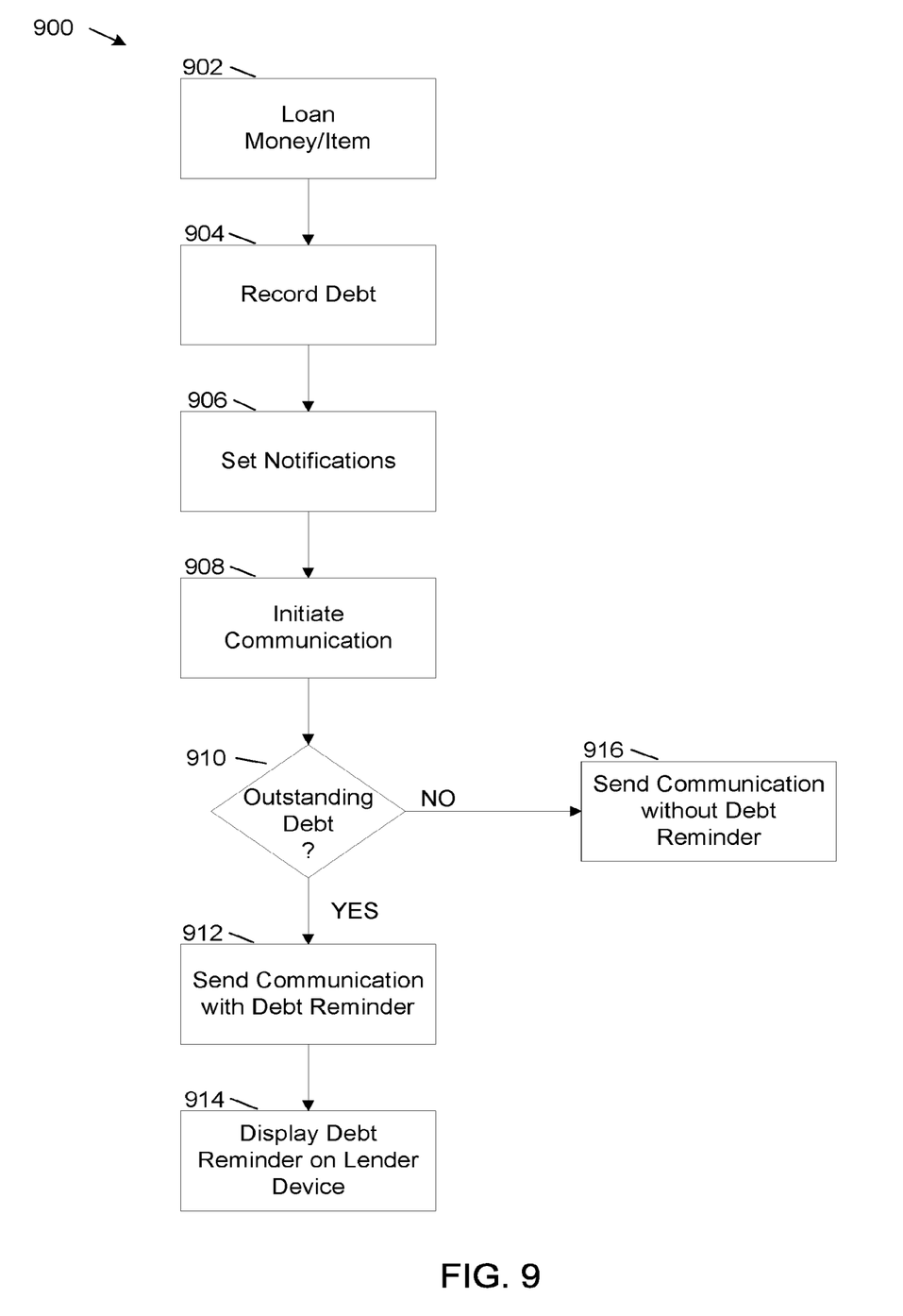
FIG. 9 shows a method implemented on a user device of FIG. 1 for sending a debt reminder to a recipient of a loan.

FIG. 9 shows a flowchart of an example method 900 for sending a debt reminder to a recipient of a loan. The debt reminder is sent during a communication between a lender of the loan and the recipient of the loan. The communication can be one of a telephone call, a text message, an email message, a social media post and an instant message.

At operation 902, the lender loans money or an item to a recipient. Typically a small amount of money may be loaned to a family member, friend or acquaintance of the recipient.

However, it in some cases a non-monetary item, for example a lunch, a cup of coffee, a dozen eggs, a tool, etc. can be loaned to the recipient.

At operation 904, the lender records the debt incurred to the recipient on a user device of the lender, for example on user device 102. User device 102 is typically a mobile electronic computing device such as a smart phone. However user device 102 can also be a non-mobile wired device such as a desktop computer or laptop computer.

At operation 906, notifications are set on user device 102. Setting notifications comprises selecting a type of communication that will generate a debt reminder for the lender and the recipient. As discussed in regard to FIG. 3, the types of communications that can be selected include a phone call, a text message, an email message, a social media post and an instant message.

At operation 908, a communication is initiated between the lender and the recipient. The communication can be one of a telephone call, a text message, an email message, a social media post and an instant message. Typically, the communication corresponds to the communication selected to generate a debt reminder.

At operation 910, a determination is made as to whether the recipient of the communication owes any outstanding debt to the lender of the communication.

When a determination is made at operation 910 that the recipient does owe outstanding debt to the lender, at operation 912, a communication is sent to the recipient that includes a debt reminder. When the recipient receives the communication, a debt reminder is displayed on a user device of the recipient, for example on user device 104.

In addition, at operation 914, a debt reminder is displayed on the user device of the lender, for example on user device 104. The debt reminder comprises a message or notification that indicates that a specific amount of money or a non-monetary item is owed to the lender by the recipient.

When a determination is made at operation 910 that the recipient does not owe outstanding debt to the lender, at operation 916, a communication is send to the recipient that does not include a debt reminder. For example the communication can be a text message that does not cause a debt reminder to be displayed on the user device of the recipient.

Figure 10:
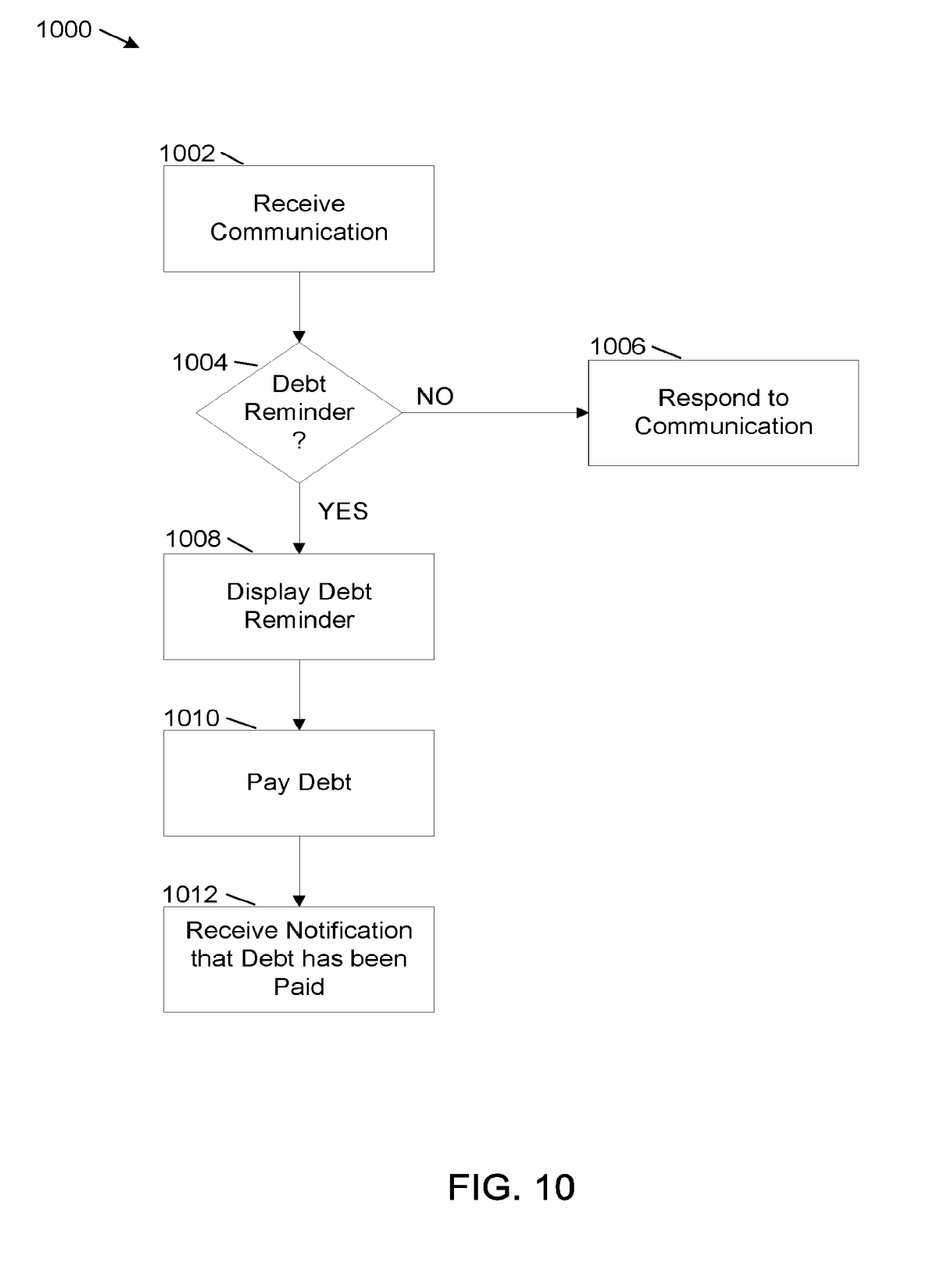
FIG. 10 shows a method implemented on a user device of FIG. 1 for receiving a communication that can include a debt reminder.

FIG. 10 shows a flowchart of an example method 1000 for receiving a communication, for example at user device 104, which can include a debt reminder.

At operation 1002, the communication is received at user device 104 from a user at user device 102. The communication can be one or more of a telephone call, a text message, an email message, a social media post or an instant message.

At operation 1004, a determination is made as to whether the communication includes a debt reminder. As discussed in regard to method 900, when the communication is from a lender to a recipient and a determination is made that the recipient owes a debt to the lender, the communication can include a debt reminder.

At operation 1004, when a determination is made that the communication does not include a debt reminder, at operation 1006, a debt reminder is not displayed on user device 104 and the user at user device 104 responds normally to the communication. For example, when the communication is a telephone call, the user at user device 104 answers the telephone call and when the communication is a text message, the user at user device 104 responds to the text message with another text message.

At operation 1004, when a determination is made that the communication does include a debt reminder, at operation 1008, a debt reminder is displayed on user device of the recipient of the communication. For example, the debt reminder can be displayed on a smart phone of the recipient of the communication.

At operation 1010, the recipient of the communication activates a payment control on user device 104. The activation of the payment control initiates a payment of a monetary amount owed to the lender. Specifically, user device 104 can send a request to a financial services provider, for example to financial services provider server computer 106 to transfer funds in an amount of the debt owed to the lender at user device 102.

At operation 1012, the user at user device 104 receives a notification from the financial services provider that the debt has been paid.

Figure 11:
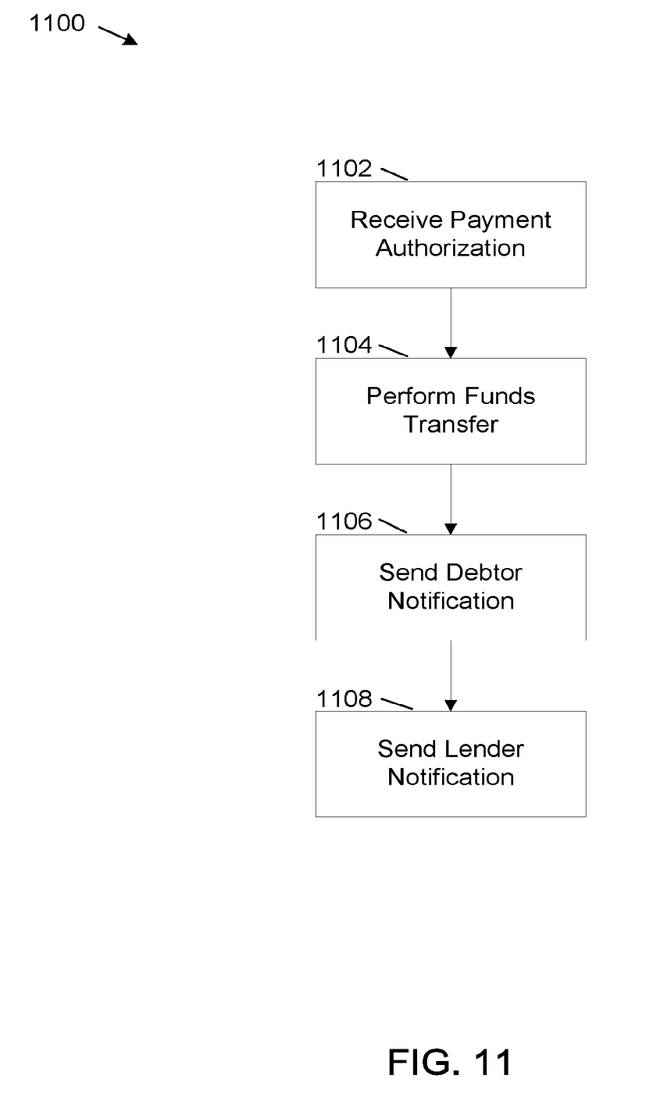
FIG. 11 shows a method implemented on the financial services provider server computer of FIG. 1 for performing a funds transfer.

FIG. 11 shows a flowchart of an example method 1100 for performing a funds transfer at financial services provider server computer 106. As discussed earlier herein, financial services provider server computer 106 can be a server computer at a financial services provider for transferring funds, such as Venmo, Google Wallet and PayPal.

At operation 1102, financial services provider server computer 106 receives a payment authorization from user device 104. The payment authorization comprises an authorization to transfer funds to the lender at user device 102. As discussed earlier herein, the authorization may be based on authorization information that the user at user device 104 provides, such as an account number or a PIN.

At operation 1104, the financial services provider server computer 106 transfers funds from an account of the user at user device 104 to an account of the user at user device 102, based on account information previously set up at the financial services provider.

At operation 1106, financial services provider server computer 106 sends a debtor notification to the user at user device 104. The debtor notification provides confirmation that the user at user device 104 paid the debt owed to the lender at user device 102.

At operation 1108, financial services provider server computer 106 sends a lender notification to the lender at user device 102. The lender notification provides confirmation that the user at user device 104 paid the debt owed to the lender at user device 102.

Figure 12:
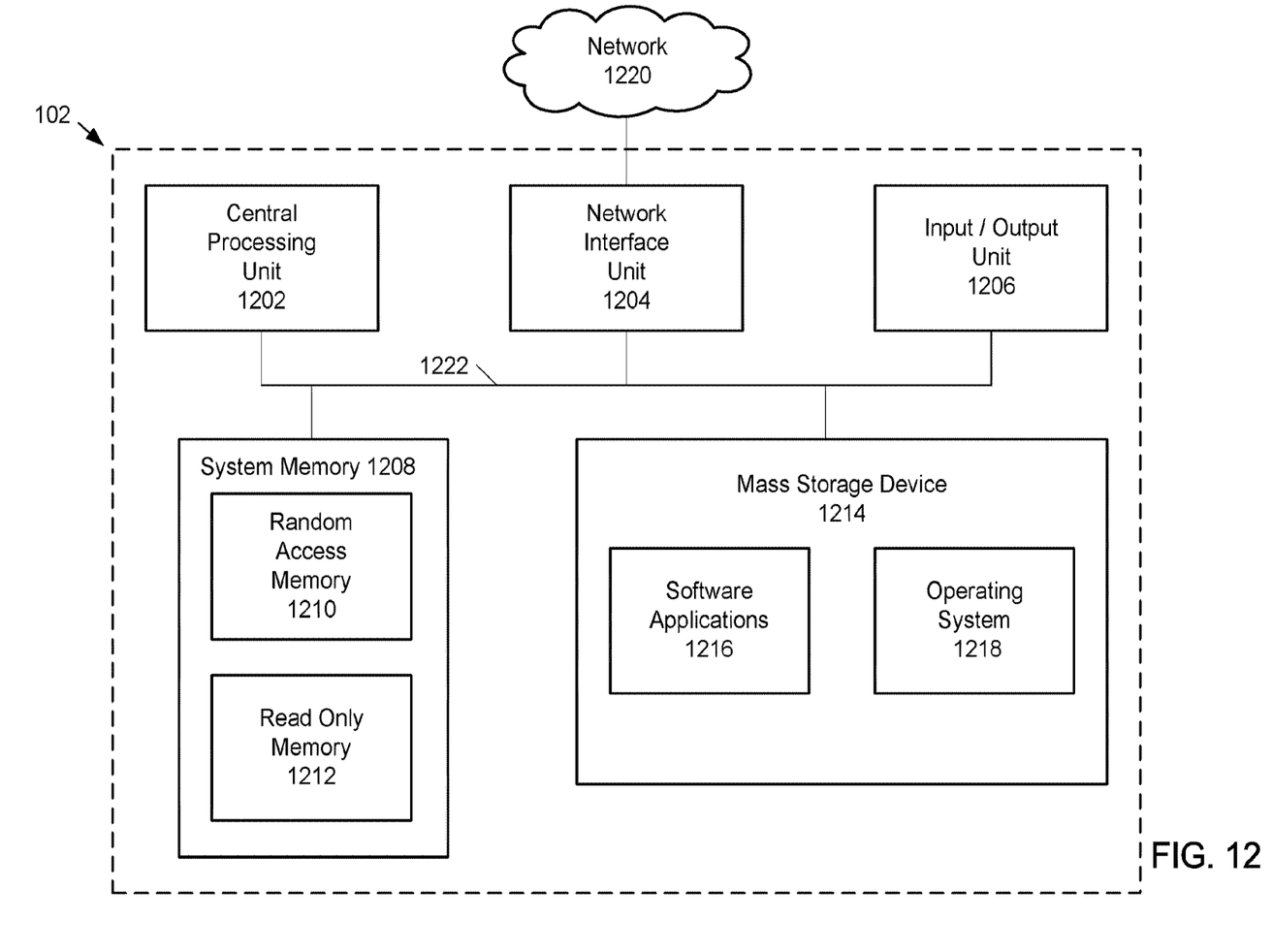
FIG. 12 shows example physical components of the user devices of FIG. 1.

As illustrated in the example of FIG. 12, user device 102 includes at least one central processing unit ("CPU") 1202, a system memory 1208, and a system bus 1222 that couples the system memory 1208 to the CPU 1202. The system memory 1208 includes a random access memory ("RAM") 1210 and a read-only memory ("ROM") 1212. A basic input/output system that contains the basic routines that help to transfer information between elements within the user device 102, such as during startup, is stored in the ROM 1212. The user device 102 further includes a mass storage device 1214. The mass storage device 1214 is able to store software instructions and data. Some or all of the components of the user device 102 can also be included in user device 104.

The mass storage device 1214 is connected to the CPU 1202 through a mass storage controller (not shown) connected to the system bus 1222. The mass storage device 1214 and its associated computer-readable data storage media provide non-volatile, non-transitory storage for the user device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the user device 102.

According to various embodiments of the invention, the user device 102 may operate in a networked environment using logical connections to remote network devices through the network 1220, such as a wireless network, the Internet, or another type of network. The user device 102 may connect to the network 1220 through a network interface unit 1204 connected to the system bus 1222. It should be appreciated that the network interface unit 1204 may also be utilized to connect to other types of networks and remote computing systems. The user device 102 also includes an input/output controller 1206 for receiving and processing input from a number of other devices, including a touch user interface display screen, or another type of input device. Similarly, the input/output controller 1206 may provide output to a touch user interface display screen or other type of output device.

As mentioned briefly above, the mass storage device 1214 and the RAM 1210 of the user device 102 can store software instructions and data. The software instructions include an operating system 1218 suitable for controlling the operation of the user device 102. The mass storage device 1214 and/or the RAM 1210 also store software instructions, that when executed by the CPU 1202, cause the user device 102 to provide the functionality of the user device 102 discussed in this document. For example, the mass storage device 1214 and/or the RAM 1210 can store software instructions that, when executed by the CPU 1202, cause the user device 102 to display received data on the display screen of the user device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An electronic computing device of a lender individual, the electronic computing device comprising:
   a processing unit; and
   system memory, the system memory including instructions which, when executed by the processing unit, cause the electronic computing device to:
      receive information from an application including a personal ledger of debt owed to the lender individual about a debt the lender individual provided to a borrower individual, the debt involving money the borrower individual borrowed from the lender individual;
      receive a request on the electronic computing device by the lender individual to initiate a communication with the borrower individual, the communication being unrelated to the debt; and
      display a debt reminder adjacent to a name of the borrower individual on a contact list on the electronic computing device, the debt reminder providing the lender individual with information about the debt, including a monetary amount that the borrower individual owes the lender individual, prior to the communication with the borrower individual being initiated.

2. The electronic computing device of claim 1, wherein the instructions further cause the electronic computing device to include the debt reminder in the communication.

3. The electronic computing device of claim 1, wherein the instructions further cause the electronic computing device to receive a selection of one or more communication types associated with the debt reminder from the lender individual.

4. The electronic computing device of claim 1, wherein the instructions further cause the electronic computing device to execute a communications module for establishing the communication between the lender individual and the borrower individual and a debt reminder module for tracking the debt and for displaying the debt reminder.

5. The electronic computing device of claim 4, wherein the debt reminder module is embedded within the communications module.

6. The electronic computing device of claim 1, wherein the communication comprises a telephone call between the lender individual and the borrower individual, the debt reminder being displayed on the display screen of the electronic computing device when the telephone call is initiated by the lender individual.

7. The electronic computing device of claim 1, wherein the communication comprises a text message between the lender individual and the borrower individual, the debt reminder being displayed on the display screen of the electronic computing device when the text message is initiated by the lender individual.

8. The electronic computing device of claim 1, wherein the communication includes one of an email, a social media post or an instant message.

9. The electronic computing device of claim 1, wherein the instructions further cause the electronic computing device to implement a graphical user interface (GUI), the GUI permitting a display of the personal ledger of personal debt owed by one or more people.

10. The electronic computing device of claim 1, wherein the instructions further cause the electronic computing device to implement a graphical user interface (GUI), the GUI permitting selection of one or more communication types associated with the debt reminder, wherein the type of communication is one of a telephone call, a text message, an email message, a social media post and an instant message.

11. A method for reminding a lender individual of a debt, the method comprising:
   receiving information about the debt from an application including a personal ledger of debt owed to the lender individual, the debt being an amount of money loaned by the lender individual to a borrower individual;
   receiving a request on an electronic computing device by the lender individual to initiate a communication with the borrower individual, the communication being unrelated to the debt; and
   displaying a debt reminder adjacent to a name of the borrower individual on a contact list on the electronic computing device, the debt reminder providing the lender individual with information about the debt, including a monetary amount that the borrower individual owes the lender individual, prior to the communication with the borrower individual being initiated.

12. The method of claim 11, further comprising including the debt reminder in the communication.

13. The method of claim 11, further comprising receiving a selection of one or more communication types associated with the debt reminder from the lender individual.

14. The method of claim 11, further comprising executing a communications module for establishing the communication between the lender individual and the borrower individual and a debt reminder module for tracking the debt and for displaying the debt reminder.

15. The method of claim 14, further comprising embedding the debt reminder module within the communications module.

16. The method of claim 11, wherein the communication comprises a telephone call between the lender individual and the borrower individual, the debt reminder being displayed on the display screen of the electronic computing device when the telephone call is initiated by the lender individual.

17. The method of claim 11, wherein the communication comprises a text message between the lender individual and the borrower individual, the debt reminder being displayed on the display screen of the electronic computing device when the text message is initiated by the lender individual.

18. The method of claim 11, wherein the communication includes one of an email, a social media post or an instant message.

19. The method of claim 11, further comprising generating a graphical user interface (GUI), the GUI permitting a display of the personal ledger of personal debt owed by one or more people.

20. The method of claim 11, further comprising generating a graphical user interface (GUI), the GUI permitting selection of one or more communication types associated with the debt reminder, wherein the type of communication is one of a telephone call, a text message, an email message, a social media post and an instant message.

\* \* \* \* \*